United States Patent Office 3,514,253
Patented May 26, 1970

3,514,253
METAL-ALUMINUM-FLUORINE COMPLEXES
Stephen Robota, North Tonawanda, N.Y., assignor to Hooker Chemical Corporation, Niagara Falls, N.Y., a corporation of New York
No Drawing. Continuation of application Ser. No. 420,129, Dec. 21, 1964, which is a continuation-in-part of application Ser. No. 384,518, July 22, 1964. This application Aug. 14, 1968, Ser. No. 757,515
Int. Cl. C01b 9/08; C01d 9/50; B01j 11/78
U.S. Cl. 23—88                                                                     6 Claims

ABSTRACT OF THE DISCLOSURE

The metal-aluminum-fluoride composition, particularly useful as a catalyst for the fluorination of organic halides, by replacement of other halogens with fluorine, comprises particular significant proportions of aluminum, fluorine and metal, the metal being either of Group I-B, II-B, VI-B, or VIII. The catalyst is made by coprecipitating a metal-alumina composition from an alkaline solution of alumina by acidification thereof in the presence of a metal halide and fluorinating the coprecipitated composition with hydrogen fluoride at a temperature in the range of about 0 degrees centigrade to about 600 degrees centigrade.

---

This is a continuation of application Ser. No. 420,129, filed Dec. 21, 1964, now abandoned, which in turn was a continuation-in-part of application Ser. No. 384,518, filed July 22, 1964, now Pat. No. 3,306,479. This invention relates to a new composition of matter and the manufacture thereof. More particularly, this invention relates to complexes of Group I-B, II-B, VI-B and VIII metals with aluminum and fluorine and the method of preparing such compounds.

It is an object of this invention to provide complexes of Group I-B, II-B, VI-B and VIII with aluminum and fluorine. Another object of this invention is to provide new copper-aluminum-fluoride complexes, copper-metal-aluminum-fluoride complexes, iron-aluminum-fluoride complexes, cobalt-aluminum-fluoride complexes and others. A further object of this invention is to provide processes for the preparation of these new and useful catalytically active compounds. These and other objects will become apparent to those skilled in the art from the description of the invention.

In accordance with the invention, a process for the manufacture of complexes of Group I-B, II-B, VI-B and VIII metals with aluminum and fluorine is provided comprising contacting hydrogen fluoride with a complex of alumina and a metal compound containing a metal selected from Group I-B, II-B, VI-B and VIII, reacting said hydrogen fluoride with said complex thereby producing a metal-aluminum-fluoride complex.

The present invention provides a complex which is particularly useful as a catalyst for the fluorination of organic halides, in which halogens other than fluorine are replaced by fluorine. The complexes of this invention have certain desirable characteristics often lacking in fluorination catalysts. They are granular, porous solids of high surface area and high structural strength. The products are essentially non-volatile and are useful as catalysts at temperatures as high as about 600 degrees centigrade.

In view of the fact that the invention pertains to the several metals of Group I-B, II-B, VI-B and VIII of the Periodic Chart of the Elements as listed in Lange's Handbook of Chemistry, Eighth Edition, pages 56–57, these metals including copper, silver, gold, chromium, nickel, cobalt, zinc, cadmium, iron, ruthenium, rhodium palladium, etc., for simplification the disclosure and examples will be directed more particularly to copper and cobalt. However, it is to be understood that when copper is mentioned, equivalent Group I-B, II-B, VI-B and VIII metals are to be considered included and that in the description of copper, cobalt, etc., all Group I-B, II-B, VI-B and VIII metals are included. As is used herein, the term "metal" indicates metals of Group I-B, II-B, VI-B and VIII of the Periodic Chart of the Elements as listed in Lange's Handbook, Eighth Edition.

The compositions of the present invention are best described as co-precipitated metal-alumina complexes which have been fluorinated either in a separate step or in which fluorination is effected during fluorination process in which the metal-aluminum-fluoride complex is formed in the presence of the other reactants and catalyzes their reaction. Therefore, the metal-alumina complex starting material can be fluorinated to a metal-aluminum-fluoride complex by any of several methods, wherein the reaction is effected with the starting material in either a dilute or concentrated condition.

The preferred starting composition for the manufacture of the catalyst is a co-precipitated alumina complex comprised of a major proportion of alumina ($Al_2O_3$) and a lesser, but effective portion of a metal compound complexed therewith. The remainder of the starting composition, if any, is inert materials which may be merely impurities. Generally, the co-precipitated metal-alumina complex starting material is comprised of about 65 percent to about 99 percent alumina and a metal compound equivalent to one percent to 35 percent metal, with the preferred ranges being about 80 percent to about 90 percent alumina and about 5 percent to about 15 percent metal. Of course, greater and lesser amounts of metal and alumina are also effective and could be used. Thus, in the instance where the co-precipitated starting material is copper-alumina, the complex is comprised of copper, aluminum and oxygen in varying proportions, in a chemically and/or physically combined state, the structural configuration of which is not known with certainty.

The starting material, such as a copper-alumina complex, is prepared by causing an alkaline solution of alumina hydrate and an acid solution of cupric chloride to react in such proportions so as to result in a composition containing about 65 percent to 99 percent alumina and from about 1 percent to 35 percent by weight of copper, the remainder of the composition, if any, being impurities. After filtering, washing, drying, roasting, crushing and screening, this material is obtained as a granular solid. The particle size may be controlled or selected to suit the intended use. Particles ranging upward from 0.001 to 1.0 inch in diameter are particularly useful. The particles have a high porosity, large surface area, in the case of copper-alumina they are greenish in color and have a specific gravity greater than one. Through co-precipitation, the copper and alumina are homogeneously distributed throughout the catalyst. These physical attributes are unchanged by fluorination.

As an example of the preparation of the copper-alumina starting material, an aqueous solution of sodium aluminate is co-precipitated by the addition of hydrochloric acid and cupric chloride in sufficient quantity to precipitate all of the alumina. The precipitated material is filtered, washed with water and dried. In a like manner, metal-alumina complexes of the metals of Groups I-B, II-B, VI-B and VIII are also produced. It is readily seen that complexes of several metals with alumina are readily made and that complexes of alumina, Group I-B, II-B, VI-B and VIII metals wherein at least a portion of the Group I-B, II-B, VI-B and VIII metal is replaced with one or more Group III through Group VII metal may be prepared and used as a starting material. As an example, a complex of alumina and copper can be made wherein at least a portion of the copper or alumina is replaced with a metal of Group III through VIII. Such a complex is made by co-precipitating the metal by mixing hydrochloric acid and aqueous solutions of sodium aluminate, cupric chloride, and other metal chlorides of Group III through VIII metals such as ferric chloride. The concentration of metal chlorides and sodium aluminate in aqueous solution is regulated so as to produce a complex having the desired proportion of alumina and other metals as previously noted.

The compositions of the present invention are prepared by reacting the roasted metal-alumina complex with hydrogen fluoride. The fluorinated complex results in a material comprising 0.5 to 35 weight percent metal, 30 to 60 weight percent aluminum and 25 to 55 weight percent fluorine. The chemical formulation is not known with certainty but it is believed to be of the order $$x[M(AlF_4)_n] \cdot y[AlF_3]$$

where M represents metal as previously described, $x$ equals 1 to 5 and $y$ equals 1 to 10 and $n$ equals 1 to 6, depending on the valence of M.

The preferred method of effecting the fluorination is to contact the metal-alumina complex such as copper-alumina with hydrogen fluoride gas under controlled temperature conditions. The reaction of hydrogen fluoride with the coupper-alumina complex is highly exothermic.

The reaction temperature is controlled to prevent the volatilization and decomposition of the metal fluoride from the complex.

The reaction of hydrogen fluoride with the complex is effected in the temperature range of between 0 degrees centigrade and about 600 degrees centigrade, the lower temperature being that at which it is practicable to attain a suitable reaction rate. The higher limit is that at which metal halides are decomposed or volatilized from the complex. The preferred reaction temperature range for a copper-alumina complex is 70 degrees centigrade to 450 degrees centigrade, using gaseous hydrogen fluoride.

The exothermic reaction is controlled within the desired temperature range by controlling the addition of hydrogen fluoride to the starting material and by the use of an inert diluent gas to aid in the removal of heat and water from the locus of the reaction. Other means of controlling the reaction temperature can be used, such as effecting the hydrofluorination of the starting material in a dilute condition as that obtained by dispersing the starting material in an inert or less reactive material either solid or liquid.

It is readily seen that the fluorination of copper-alumina can be carried out with the complex material being dispersed in an inert organic solvent, a fluorinated organic liquid, or an organic halide which is to be subsequently fluorinated. A catalytic or larger amount of copper-alumina can readily be fluorinated in this manner. Such procedures are desirable in that hot spots and ultimate decomposition of the prepared copper-aluminum-fluoride complex are readily prevented. Also, it has been found that the fluorination of the metal-alumina starting material is easier to control under such conditions.

In the normal preparation of the composition of this invention, the rate of fluorination is governed by factors which control the "hot spot" in the reactant bed. With improved heat dissipation from the reactor and the locus of the reaction, higher hydrogen fluoride addition rates can be utilized. In addition, with improved heat dissipation, the volume of inert diluents can be reduced.

For most reactors suitable for the present hydrofluorination, adequate cooling is effected by using an inert gas to hydrogen fluoride dilution ratio of about 0.1:1 to 40:1 by weight. It is also possible to run the reaction without the use of an inert gas diluent. However, the use of the inert gas is preferred.

The gas diluents, hydrogen fluoride, and gaseous mixtures, are normally used at ambient temperatures but they can also be used at higher or lower temperatures. Low gas temperatures are preferred as an aid in controlling the reaction temperature.

The diluent used with the hydrogen fluoride gas can be any gas or mixture of gases which is inert to the reaction conditions. Such gases as air and nitrogen are preferred. They are in plentiful supply and are low in cost.

The reaction is carried out in a reactor having a support therein for the granular starting material and means for heating the granular material to a uniform temperature of about 100 to 110 degrees centigrade. Such means include both interior and exterior heating means as well as means for heating gas which is passed through the starting material. The reactor is constructed of a material which is resistant to the action of hydrogen fluoride and which can withstand the temperatures encountered during fluorination. Nickel and nickel alloys may be used for this purpose. The reactor is also equipped with means for determining the temperature in various positions within the reaction bed. A movable thermocouple is satisfactory for this purpose.

Hydrogen fluoride, in an inert gas, is passed through a reaction bed of copper-alumina complex at a concentration such that the temperature does not exceed about 600 degrees centigrade and preferably is not more than 500 degrees centigrade. The addition of hydrogen fluoride causes a rapid rise in temperature at the inlet end of the bed. This hot zone then moves progressively through the bed. Maximum temperature at the hot zone should be about 600 degrees centigrade, preferably 500 degrees centigrade. When this temperature is approached, the hydrogen fluoride concentration is lowered and the inert gas flow rate is raised, if necessary, until the reaction subsides. The minimum temperature in the bed is normally maintained above about 70 degrees centigrade to minimize water absorption by the solid particles. Hydrogen fluoride addition is continued until the rate of evolution of water from the reaction decreases appreciably. The time required for complete fluorination varies from about 1 hour up to about 72 hours or more.

Completion of the reaction is indicated by cessation of water evolution and the detection of hydrogen fluoride at the exit of the reactor. Preferably, at this time, the concentration of hydrogen fluoride in the inert gas being added is increased until the reaction temperature subsides. If desired, fluorination may be terminated prior to completion.

Another method of fluorinating the starting material is to effect the fluorination thereof while in contact with materials such as an inert liquid or a halogenated organic liquid. By passing hydrogen fluoride through the liquid mixture, the inorganic complex is fluorinated in the presence of the organic liquid until at least a partial fluorination is effected.

The invention will be readily understood with reference to the following examples which are illustrations of certain preferred embodiments of the present invention. Unless otherwise indicated, all temperatures are in degrees centigrade and all parts and percentages used herein are by weight.

EXAMPLE 1

A copper-alumina complex was prepared by reacting 3000 cc. of concentrated solution of sodium aluminate by diluting to about 20 times its volume and slowly mixing with a diluted solution of 200 grams of copper chloride and sufficient hydrochloric acid that all aluminum hydroxide was precipitated. The precipitate was filtered, washed with water, and roasted at a temperature of 400 degrees centigrade. The roasted product was then crushed to an average particle size diameter of one quarter inch to one eighth inch. Sufficient product was prepared in this manner to yield 1403 grams of dried product.

The copper-aluminum-fluoride complex was prepared by placing 1403 grams of the prepared granular copper-alumina complex, having an assay of 45.91 weight percent aluminum, 8.71 weight percent copper, the remaining constituent being substantially oxygen, into a tubular nickel reactor having an inside diameter of two inches.

The reaction was initiated by heating the copper-alumina precipitated complex to a temperature of 110 degrees centigrade while passing a one liter per minute stream of nitrogen gas through the reactor. The initial heating prevented subsequent condensation of water in the reaction bed.

With nitrogen still flowing, 0.7 gram per minute of hydrogen fluoride was metered into the reactor after maintaining a reaction bed temperature in the range of 100 and 110 degrees centigrade for one half hour. The temperature, at the initial contact of hydrogen fluoride and the copper-alumina starting material, immediately increased at the gas inlet end of the bed to about 200 degrees centigrade. The flow of hydrogen fluoride was adjusted to about 1.0 gram per minute to control the temperature at the "hot spot," the locus of the reaction, in the range of 200 degrees centigrade to 300 degrees centigrade. The flow of nitrogen was such that the nitrogen to hydrogen fluoride dilution ratio was about 2.5 to 1 by volume.

Water was evolved from the reactor and collected by condensing the exit vapors. The locus of the reaction, indicated by the hot zone in the reactor, progressively moved through the bed. The fluorination was terminated when hydrogen fluoride was detected at the exit of the reactor as noted by the reaction of ammonia vapors with hydrogen fluoride. During the reaction, a total of 1670 grams of hydrogen fluoride was used and 715.3 grams of water were condensed from the exit vapors. 2360 grams of fluorinated product were recovered.

The resulting copper-aluminum-fluoride compound had retained the physical shape and strength of the unfluorinated copper-alumina complex. Analysis of the granular product indicated that the resulting composition comprised about 42.3 weight percent aluminum, 8.02 weight percent copper and 49.6 weight percent fluorine. This composition was subsequently successfully used as a catalyst in the fluorination of benzotrichloride to yield benzotrifluoride.

EXAMPLE 2

A copper-aluminum-fluoride composition was prepared by placing a copper-aluminum oxide co-precipitated complex, prepared as in Example 1, containing 48 percent aluminum, 7 percent combined copper, into a nickel reactor similar to that used in Example 1. The granules of copper-alumina complex in the bed averaged one eighth to three eighths inch in diameter. Heat was applied to the reactor so as to uniformly heat the copper-aluminum oxide starting material to a uniform temperature of 105 degrees centigrade. A small flow of air was passed through the reactor during the initial heating phase. After obtaining a uniform temperature of 105 degrees centigrade throughout the starting material, hydrogen fluoride was added to the air entering the reactor. A flow rate of about 0.87 gram of hydrogen fluoride per minute per 1000 grams of starting material was initiated. The volume ratio of air to hydrogen fluoride was about two volumes air to one volume hydrogen fluoride. On contact of the hydrogen fluoride with the starting material, an exothermic reaction ensued at the point of contact. A temperature of about 250 degrees centigrade was rapidly reached. The ratio of air to hydrogen fluoride was adjusted so that the temperature of the reaction did not exceed 400 degrees centigrade in the locus of the reaction. Increased amounts of air or lesser amounts of hydrogen fluoride reduced the reaction temperature. The locus of the reaction, indicated by the hot spot in the reactor, progressively moved through the bed from the point of introduction of the hydrogen fluoride. The temperature at the hot spot was maintained in the range of 200 degrees centigrade to 400 degrees centigrade.

The termination of the reaction was again noted by the lessening of water evolution and, finally, the detection of hydrogen fluoride at the exit of the reactor. The hydrogen fluoride consumed during the reaction was 1.18 grams per gram of starting material. The water removed from the reactor amounted to 0.51 gram per gram of starting material. On completion of the reaction, the flow of hydrogen fluoride through the reactor was terminated and the reactor was purged with air to remove residual hydrogen fluoride. The copper-aluminum-fluoride composition prepared in this manner was subsequently used as a catalyst to effect the vapor phase fluorination of benzotrichloride to benzotrifluoride using hydrogen fluoride.

EXAMPLE 3

A cobalt alumina complex was prepared by reacting 1345 grams of $CoCl_2 \cdot 6H_2O$ in solution with 557 grams of concentrated hydrochloric acid with 780 grams of finely divided $Al_2O_3$ powder dissolved in 2034 grams of 33 percent sodium hydroxide. On mixing the liquids at room temperature, a slurry was formed. The slurry was heated to 90 degrees centigrade and then filtered and washed. The filter cake was oven dried and then was roasted at 400 degrees centigrade. The resulting cake was black in color, hard and granular when broken.

Analysis of the product indicated that it was a complex comprising 18 percent by weight cobalt, 42 percent by weight aluminum and the remainder being substantially oxygen. This material was useful as a starting material for forming a cobalt-aluminum-fluoride catalyst material.

EXAMPLE 4

The product of Example 3 was fluorinated by placing 81 grams of granular material on a mesh support in a three quarter inch tubular reactor. The particle size was that which passed through a number 5 Tyler Standard screen but was retained on a number 7 Tyler Standard screen. Before the fluorination reaction was commenced, air was passed through the reactor at a rate of one liter per minute. Hydrogen fluoride at a rate of 0.4 gram per minute was then added to the air flow. The temperature at the gas inlet end of the granular bed immediately increased to 100 degrees centigrade. The concentration of hydrogen fluoride and the volume of air were then adjusted so that the temperature in the reaction zone did not exceed 400 degrees centigrade. This rate corresponded to an average air to hydrogen fluoride dilution ratio of 3:1 by weight. The hydrogen fluoride flow rate averaged 0.3 gram per minute after adjustment.

During the reaction, the reaction zone or hot zone progressed from the gas inlet end through the bed toward the gas outlet end. Water, evolved from the reaction zone, was condensed and collected from the effluent gases. When the condensation of water ceased, the reaction was considered to be complete. A total of 37 grams of water was collected during the fluorination.

The fluorinated product was pink in color and analysis indicated that it comprised about 16.5 percent cobalt, 39 percent aluminum and 44 percent fluorine.

The fluorinated product was subsequently successfully used as a catalyst in the fluorination of octachlorocyclopentene with hydrogen fluorine to hexafluorodichlorocyclopentene.

EXAMPLE 5

Copper-alumina complex, prepared as in Example 1, was ground to a particle size which passed through a U.S. Sieve No. 10 and was retained on a U.S. Sieve No. 25. 40.8 grams of this material was added to 1360 grams of benzotrifluoride in a stirred nickel reactor having an exit for volatilized gases. Hydrogen fluoride was bubbled into the mixture, while agitating, at a rate of 60.5 grams per hour for 16.6 hours. During the process, the reactor temperature was maintained between 102 degrees centigrade and 105 degrees centigrade. At one hour intervals, small quantities of benzotrichloride were added to the reaction mixture, the total during the reaction being 1395 grams. 1321 grams of organic product were condensed from the gases exiting from the reactor.

At the end of the run, the copper-alumina complex was filtered out of the organic liquid remaining in the reactor and analyzed. The complex was found to be a copper-aluminum-fluoride material comprised of 32.2 parts fluorine, 3.6 parts chlorine, 6.2 parts copper, and 19.4 parts aluminum. Although fluorination was incomplete, this complex proved to be an effective fluorination catalyst.

The composite sample of collected organic, as analyzed by gas chromatography, was comprised of 66 percent benzotrifluoride, 24.5 percent α,α-difluoro-α-chlorotoluene, 4.7 percent α-dichloro-α-fluorotoluene and 4.8 percent α,α,α-trichlorotoluene. The reactor contents at the end of the run contained 45.5 percent benzotrifluoride, 49.0 percent α-chloro-α,α-difluorotoluene, 5.5 percent α-fluoro-α,α-dichlorotoluene and a trace of benzotrichloride.

EXAMPLE 6

54.9 grams of copper-alumina complex, prepared as in Example 1 and ground to a U.S. Sieve size as in Example 5, was added to 549 grams of benzene in a nickel reactor equipped with stirring means and a reflux condenser. The reaction mass was heated to 63 degrees centigrade to 72 degrees centigrade for a period of two hours during which time HF was slowly bubbled through the mixture. At the end of the two hour period, the finely divided solid was separated from the benzene by filtration. The solid was analyzed and found to contain 47.7 percent fluorine, 6.21 percent copper and 18.3 percent aluminum.

EXAMPLE 7

A chromium-alumina complex was prepared by dissolving 142 grams of $CrCl_3 \cdot 6H_2O$ in 426 grams of 36.7 percent HCl. This solution was reacted at 100 degrees centigrade with 280 grams of $Al_2O_3 \cdot 2H_2O$ dissolved in 522 grams of 33 percent NaOH. The reactants were vigorously agitated and brought to a neutral pH by adjusting with HCl. A thick slurry formed to which water was added in amounts necessary to retain fluidity. The preciptate was filtered and the resultng cake was washed with hot water. The cake was oven-dried at 145 degrees centigrade and subsequently calcined at 340 degrees centigrade for three hours. The complex was olive drab in color and broke easily into fine granular particles. This co-precipitated chromium-alumina complex contained 7.2 parts Cr and 35.3 parts aluminum.

A charge of 1469 grams of p-chlorobenzotrichloride having an index of refraction of $N_D^{24}$ 1.5710 and a specific gravity of 1.4845, was placed in a 1.2 liter nickel reactor equipped with an agitator. Also added was 146.9 grams of the co-precipitated chromium-alumina complex. HF was then metered into the mixture at a rate such that 0 to 11 percent of the vent gases was HF, the remainder being substantially HCl. The fluorination of the catalyst and of the organic liquid was carried out in situ at 60 degrees centigrade. After five hours of fluorination the refractive index of the organic was 1.5305. Fluorination was continued further to a final refractive index of 1.4927 and a specific gravity of 1.3788. This product, analyzed by gas chromatography, contained 11.3 percent p-chlorobenzotrifluoride, 75.0 percent p-chloro-α,α-difluoro-α-chlorotoluene, 10.8 percent p-chloro-α-fluoro-α,α-dichlorotoluene and 1.1 percent p-chlorobenzotrichloride. The catalyst was removed from the organics by filtration, washed and dried. Analysis of the catalyst showed that it contained 25.1 parts fluorine, 2.7 parts chromium and 10.1 parts aluminum.

EXAMPLE 8

An iron-alumina complex was prepared by dissolving 94.8 grams of $FeCl_3$ in 462 grams of 36.7 percent HCl. This solution was reacted at 100 degrees centigrade with 280 grams of $Al_2O_3 \cdot 2H_2O$ dissolved in 522 grams of 33 percent NaOH. The reactants were vigorously agitated and brought to a neutral pH. The precipitate formed was centrifuged and washed with a hot water spray. The filter) cake was oven dried at 145 degrees centigrade and then calcined at 350 degrees centigrade for three hours. The complex obtained was rust in color and in the form of a hard cake. The co-precipitated iron-alumina complex contained 10.5 parts iron and 35.0 parts Al.

39 grams of the co-precipitated iron-alumina complex was granulated to particles of about 0.2 to 0.03 inch and placed in a one inch diameter vertical tube reactor heated externally by an electric furnace. The reactor was connected to a similar horizontal unit serving as a preheater and vaporizer. The complex was flurinated by passing controlled amounts of HF and air into the preheater. The HF rate was 1.39 grams per minute. The initial molar air:HF ratio was 19:1. The dilution ratio was decreased so that finally only HF was used. Water was obtained as a by-product of the reaction and could be condensed from the exit vapors. During fluorination the maximum bed temperature was 340 degrees centigrade. The fluorination was terminated after two hours.

392 grams of benzotrichloride, having a specific gravity of 1.362 and a refractive index at 25 degrees centigrade of 1.5565, was passed at a rate of 0.91 gram per minute in admixture with HF vapor through the fluorinated complex. The ratio of HF to benzotrichloride was at a rate of 44.6 percent in excess of the stoichiometric. Temperature readings in the bed ranged from 241 degrees centigrade to 362 degrees centigrade. 298 grams of water white liquid was recovered as product. This product had a specific gravity of 1.2529 and a refractive index of $N_D^{24}$ 1.4689. Gas chromatography analyzed the product as: 21.3 percent benzotrifluoride, 47.0 percent α-chloro-α,α-difluorotoluene, 25.0 percent α-fluoro-α,α-dichlorotoluene and 3.8 percent benzotrichloride.

EXAMPLE 9

A copper-cobalt-aluminum-fluorine complex was prepared in the following manner:

24.5 grams of $CuCl_2 \cdot 2H_2O$ and 19.8 grams of $$CoCl_2 \cdot 6H_2O$$

were dissolved in 213 grams of 37 percent aqueous HCl. 140 grams of $Al_2O_3 \cdot 2H_2O$ were dissolved in 261 grams of 33 percent aqueous NaOH. This solution was slowly added to the acid solution of the cobalt and copper salts. The final pH was adjusted to approximately 7.0 with HCl.

A heavy precipitate formed which was subsequently filtered, washed thoroughly, dried at 110 degrees centigrade and roasted for three hours at 350 degrees centigrade. The roasted product was then broken into granules which passed through a U.S. Sieve No. 4 and were retained on a U.S. Sieve No. 25. 100 grams of granules were placed in a one inch nickel tube and heated to about 100 degrees centigrade. Hydrogen fluoride diluted with nitrogen in an average molar ratio of three nitrogen to one HF was passed into the tube. The temperature at the point where the HF just contacted the solid particles rose to about 250 degrees centigrade, and the nitrogen flow was increased to prevent the temperature from going higher. When the reaction had progressed all the way through the bed, the preparation was considered complete. During the reaction, water of reaction was detected in the exit gasses. By collecting this water the degree of fluorination could be determined. This material was subsequently used as a catalyst to effect the reaction of HF with benzotrichloride.

While there have been described various embodiments of the invention, the compositions and methods described are not intended to limit the scope of the invention as it is realized that changes therein and substitution of equivalents are possible within the invention. It is further intended that each element recited in any of the following claims is to be understood as referring to all equivalent

I claim:

1. A composition of matter comprising a metal-aluminum-fluoride catalyst characterized as a granular, porous, non-volatile solid material of high surface area and high structural strength, useful as a catalyst at temperatures as high as 600 degrees centigrade, containing 30 to 60 weight percent of aluminum, 25 to 55 weight percent of fluorine and 0.5 to 35 weight percent of a metal selected from the group of metals appearing in Groups I-B, II-B, VI-B and VIII of the Periodic Table, and prepared by co-precipitating a metal-alumina composition from an alkaline solution of alumina by acidification thereof in the presence of a metal chloride, said metal being a member of the group consisting of the Groups I-B, II-B, VI-B and VIII of the Periodic Table, filtering, washing and drying the co-precipitate, and subsequently fluorinating in a reactor the co-precipitated metal-alumina composition with hydrogen fluoride in the presence of an inert diluent gas at a maintained and controlled temperature of about 0 degrees centigrade to about 600 degrees centigrade, to prevent the decomposition and volatilization of metal fluoride from the metal-aluminum-fluoride composition produced, until the reaction to produce said metal-aluminum-fluoride composition is completed as indicated by cessation of water evolution and detection of hydrogen fluoride at the exit of the reactor.

2. The metal-aluminum-fluoride composition of claim 1 in which said metal is copper.

3. The metal-aluminum-fluoride composition of claim 1 in which said metal is cobalt.

4. The metal-aluminum-fluoride composition of claim 1 in which said metal is chromium.

5. The metal-aluminum-fluoride composition of claim 1 in which said metal is iron.

6. The metal-aluminum-fluoride composition of claim 1 in which said metal is nickel.

References Cited

Pascal's book, Nouveau Traite de Chimie Minerale, tome VI, 1961 ed., pp. 532 and 533. Mason and Co., editors, Paris, France.

Dr. J. H. Simons' book, Fluorine Chemistry, 1950 ed., vol. 1, p. 32. Academic Press Inc., New York.

EDWARD STERN, Primary Examiner

U.S. Cl. X.R.

252—442

PO-1050
(5/69)

UNITED STATES PATENT OFFICE
CERTIFICATE OF CORRECTION

Patent No. 3,514,253      Dated May 26, 1970

Inventor(s) Stephen Robota

It is certified that error appears in the above-identified patent and that said Letters Patent are hereby corrected as shown below:

Column 1, line 32, delete "now Patent Number 3,306,479" and insert --- now abandoned ---.

SIGNED AND
SEALED

SEP 29 1970

(SEAL)
Attest:

Edward M. Fletcher, Jr.
Attesting Officer

WILLIAM E. SCHUYLER, JR.
Commissioner of Patents